Patented July 21, 1936

2,047,957

UNITED STATES PATENT OFFICE 2,047,957

COATED ARTICLE

John Fletcher, Kenmore, N. Y., assignor to Plastergon Wall Board Company, Buffalo, N. Y., a corporation of New York No Drawing. Application April 14, 1934, Serial No. 720,655

12 Claims. (Cl. 91—70)

This invention relates to the coating of various articles, and particularly to non-porous objects and those formed of metal, concrete, tar and asphalt. Heretofore, it has been difficult to cause coatings of different materials to adhere to various objects, owing to the lack of adhesion between the object and the coating, yet some of such coatings would be particularly valuable if adherence thereof to various objects could be obtained, because such coatings are inert to, and unaffected by, most solvents and chemicals. For example, it has been difficult to coat a metallic object with an adherent film of resins, because those resins will not adhere thereto firmly, but will peel and crack. Other resins which will adhere to metal, usually do not have a sufficient resistance to solvents and chemicals.

A synthetic, resinous coating compound in liquid form has been on the market for some time under the trade name of "Vinylite", but this "Vinylite" compound, when applied to an object as a coating or film and hardened, does not adhere firmly thereto if the object is non-porous or of metal, yet a hardened film of the "Vinylite" has considerable inherent flexibility, great hardness, a high gloss, and is resistant to water and an unusually large number of chemicals. The "Vinylite" is usually supplied in solution in a ketonic solvent, such as acetone, and since acetone is commonly used as a paint and varnish remover and has a destructive action on other paint films, a coating of this "Vinylite" cannot be successfully applied over the usual primer coatings, because the acetone solvent of the "Vinylite" causes a loosening and destruction of the film paint or coating to which it is applied.

The "Vinylite" resins, while sold under a trade name, are well known in the art and are described for example, in an article published on pages 645-652 of "Industrial and Engineering Chemistry" for June 1, 1933, also in U. S. Patent Number 1,935,577, issued November 14, 1933 to E. W. Reid, and on page 252 of the October 1932 issue of "Canadian Chemistry and Metallurgy". Reference to those articles and to that patent may be had, for a more complete identification and disclosure of the character of the substances herein referred to as "Vinylite" or "Vinylite" resins. These "Vinylite" resins are believed to be obtained by the polymerization of vinyl compounds, such as vinyl acetate and vinyl chloride, and are thermoplastic in character.

Ordinary paint and lacquers cannot be successfully applied to articles or surfaces of concrete, tar or asphalt because the tar and asphalt tend to dissolve or soften the rosin and other ingredients of the paint or lacquer, and the free alkali of the concrete is destructive to ordinary paints and causes them to soften, chip and loosen.

An object of this invention is to provide an improved method of coating articles of every character, by which any paint or coating material may be applied to the surfaces of any material and caused to adhere thereto, and which will provide on the article coated a film or protective coating that will have considerable flexibility, an attractive appearance, and a maximum resistance to moisture, and most solvents and chemicals, and which may be easily practiced in a simple and inexpensive manner and with inexpensive apparatus.

Another object of the invention is to provide an improved method by which any object may be given an adherent coating of "Vinylite", and with which the "Vinylite" film will be permanently anchored to the object.

Another object of the invention is to provide an improved coated article, with which the coating thereof will have maximum resistance to wear, scratches and abrasion, to moisture, and to the action of most chemicals, with which the protective coating will not be injured or loosened when the article is flexed, even to a considerable extent, and which will be relatively simple and inexpensive.

A further object of the invention is to provide an improved "Vinylite" coating liquid, which will have all of the properties of liquid "Vinylite" heretofore available, and which, in addition, has superior flowing properties and greater clearness.

A further object of the invention is to provide an under coating or primer coating for use on objects of any material, which will receive and hold coatings of other materials, which will adhere to both porous and non-porous objects, and which will be relatively inexpensive.

Various other objects and advantages will appear from the following description of examples of this invention, and the novel features will be particularly pointed out hereinafter in connection with the appended claims.

The resin known as "Vinylite" is soluble in but few chemicals, such as ketones, and acetone is the solvent most commonly employed. A solution of "Vinylite" in acetone has a milky appearance and does not flow freely when applied as a coating or film to an object.

I have discovered a primer coating material which will adhere firmly to metal and many other non-porous objects, and which will receive and firmly hold a film of vinyl resins such as "Vinylite", and which will be unaffected by the acetone that is used as the solvent or liquid vehicle for the vinyl resin. This improved primer compound may be prepared by blending a phenol-aldehyde semi-resin, condensed in the presence of an alkali catalyst, and arrested before a solid resin is formed, with one or more other resins which have the property of adherence to metal, such as a kauri gum natural resin or a phthalic anhydride-glycerol-fatty acid type resin, or a hard black resin derived from pine wood and known in the trade under the name "Vinsol Resin No. 1." This Vinsol resin is believed to consist chiefly of highly oxidized and highly polymerized abietic acid and terpenes, and is the gasoline-insoluble portion of oxidized rosin (oxidized abietic acid) produced by the steam distilled process of Naval Stores Manufacture.

The phthalic anhydride glycerol fatty acid type resin is, at the present time, preferable as the most satisfactory blending resin for most purposes because it is readily available at a relatively low cost and has the property of adhering firmly to metal. The phenol-aldehyde semi-resin is redissolved in a solvent having a high boiling point, such as in excess of approximately 140° C., and usually also with a solvent having a low boiling point, such as ethyl alcohol, and mixed with the other resins, such as the phthalic type resin. The phenols are particularly satisfactory as high boiling solvents in which the phenol-aldehyde resin is redissolved, and cresol or cresylic acid is a readily available and inexpensive, yet satisfactory, phenol that may be employed for this purpose.

The proportions of low and high boiling solvents, such as alcohol and phenol, employed as the solvent for the phenol-aldehyde resin may be varied, depending upon the conditions of use. For example, a greater percentage of alcohol is employed when a rapid or air drying coating compound is desired, and a greater proportion of the phenol is employed when a slower air drying compound is desired.

By the term "phenol", as used throughout this specification and the claims, I intend to refer to the compound phenol, and also to its homologues which are all commonly known in the art under the generic name phenol.

The phenol-aldehyde semi-resin, above referred to, is in an advancing stage, and when it is redissolved in the phenol, such as the cresol, or when the phenol is considerably in excess during the condensation of the resin, the phenol apparently acts as an inhibitor which retards the advancement of the resin toward the infusible and insoluble stage. When an article coated with this blend of resins is heated, the high boiling solvent such as the cresol is not rapidly driven off until a temperature of approximately 140° C. is obtained, and when this temperature is reached, this high boiling solvent is driven off, and a resinous film deposited on the object, which film then rapidly advances toward the insoluble and infusible stage as the firm hardens.

I have found that a harder and more chemically resistant film is obtained when a considerable proportion of a high boiling solvent is employed and the coated object heated to a temperature of at least 140° C., although a very satisfactory film for many purposes is obtained when more of the solvent with a low boiling point is used, or where the coated object is subjected to long air-drying to eliminate the solvents.

Among the aldehydes, formaldehyde is preferable because of its availability and low cost. In the formation of the phenol-aldehyde semi-resin, the percentages of phenol and aldehyde employed are not in molecular proportions, but preferably there is an excess of phenol.

A satisfactory resin of the phenol-aldehyde type may be prepared by mixing 100 pounds of commercial cresol, 75 pounds of formaldehyde (40 per cent formaldehyde and 60 percent water) and four ounces, by weight, of sodium hydroxide crystals (NaOH), which may be dissolved in a small quantity of water before it is added to the other ingredients, if desired. This mixture is then treated to produce a condensation resin in a manner well known in the art, but the condensation process is arrested after a semi-resin has formed and before a solid resin has been formed. The resin thus obtained is an advancing type resin, and the excess of the phenol, such as cresol acts as a retardant or inhibitor of advancement of the resin into the difficultly soluble and infusible stage or condition.

The water of condensation and the water from the formaldehyde solution which form a water layer, are then drawn off, after which the semi-resinous mass is advantageously but not necessarily reduced with alcohol, ethyl acetate, or with a solvent which evaporates readily at room temperatures. This heavy varnish liquor is then reduced further by the addition of a relatively high boiling solvent, such as any phenol, cyclohexanone, methyl cyclohexanol, cyclohexanol, and benzyl alcohol. Cresol is a very satisfactory but inexpensive high boiling solvent for this purpose. The amount of additional cresol or other high boiling solvent that is added may vary in amount, depending upon the particular use to which the product is to be put, but for most purposes is usually from 10 to 50 per cent (by weight) of the semi-resinous mass. The high boiling solvents preferably should have a boiling point in excess of approximately 140° C., and those having a boiling point of approximately 150° C. or higher generally give the best results.

Into this semi-resinous solution thus produced, I blend the other resin, which is preferably one having the property of adhering to metal, and the phthalic anhydride-glycerol type resin is preferable for this purpose. This phthalate type resin is conveniently added while in solution, such as, for example, approximately 60 per cent of the commercial phthalic type resin and 40 per cent of a suitable additional solvent such as xylol. Where a flexible film is desired, I also preferably add to the resinous mixture or blend, that is obtained as hereinabove explained, a suitable plasticizer, such as an alkyl ricinoleate, including butyl, acetyl ricinoleate which may be obtained from castor oil. Fatty acids, particularly linseed fatty acids, and wood oil acids, are also excellent plasticizers for this purpose, but I have found the alkyl ricinoleates to be most effective and satisfactory.

The blend of resins which has been obtained in the manner above described, constitutes a varnish or composition which when applied as a coating to any article, will air dry, or bake and become very hard. When the phenol or high boiling solvent, such as the cresol, is eliminated from the coating, either by absorption, long exposure to air, or by baking to a temperature approximately at or above the boiling point of the high boiling solvent, the resin of the film, which is in an advancing stage, will be further advanced until it becomes practically infusible, and insoluble in most solvents. Such a film is also highly resistant to acetone, alcohols, and oils. Then an article coated with this blended compound of resins is exposed to air, the low boiling solvent evaporates rapidly, and the high boiling solvent is also removed slowly, either by absorption, if the article coated is porous, otherwise by air drying. The high boiling solvent is, of course, removed more rapidly if the article is baked.

During the baking process the phenol-aldehyde portion of the resinous mixture or coating further advances to a very difficultly soluble and nearly infusible form, and the evaporation of the high boiling solvent causes the deposition on the coated object of a film which is exceedingly resistant to all acids including concentrated sulphuric, hydrochloric and hydrofluoric acids, except phosphoric acid, which is quite resistant to alkalis, although not to the same extent as to acids, and which is exceedingly resistant to many solvents, and unaffected by high temperatures. The film has maximum insolubility and adhesion, and becomes the most resistant to heat and various chemicals, when the baking process for the coated article is carried on in a temperature of over 300° F., apparently because the semi-resinous mass is carried in solution in the high boiling solvent of the coating which retards the advancement of the resins toward the infusible and insoluble stage until the boiling point of the high boiling solvent is reached and the solvent is driven off by the boiling, whereupon the semi-resinous mass of the film then advances rapidly toward the difficultly soluble and infusible stage.

The boiling point of the alcohol solvent is approximately 65° C., of xylol is approximately 140° C., of cresol is approximately 190° to 200° C., of cyclohexanone, cyclohexinol, and methyl cyclohexanon is approximately from 150° to 170° C., and of benzyl alcohol approximately from 200° to 210° C. Any of these high boiling solvents may be utilized in place of the phenol or cresol.

The blend of the phenol-aldehyde-alkali catalyst type of semi-resin with one of the other resins, particularly the phthalic anhydride-glycerol type of resin, in a solution with a high boiling solvent, and either with or without a plasticizer, produces a varnish or coating material which as a hardened coating is very durable under exposure to all kinds of weather, will adhere firmly to non-porous objects such as metal, and will receive and hold paints, enamels and varnishes of other types. This makes this blend very useful as a priming or under coating, as well as a finishing coating.

When an object coated with this improved blend is baked at a temperature of approximately 300° F. or more, the insolubility of the coating is the most pronounced or effective and the coating becomes exceedingly resistant to alcohol and acids.

When a coating of this improved blend of resins is hardened thoroughly, such as by baking the coated article, the coated article has a protecting film which is highly resistant to practically all chemicals, including acetone and ketones and, therefore, it is an excellent primer or under coating for a film of vinyl resins, such as "Vinylite", carried in a ketonic solvent such as acetone. The ketone or acetone solvent of the vinyl resin varnish will not soften or affect in any way the primer coating of resins formed from the phenol-aldehyde blend, and the film of "Vinylite" or other vinyl resin will adhere firmly to the primer film of the phenol-aldehyde blend. By adding a small quantity of a phenol, such as cresol, to the solution of the vinyl resin or "Vinylite" in the acetone, the resinous solution will lose its milky appearance, and will flow more freely and produce a uniform and smooth film on the coated object.

This improved primer blend will also receive and firmly hold other superposed films of other paints and varnishes, but the use of the improved primer under the "Vinylite" resin varnish is extremely important because no other satisfactory primer for the "Vinylite" resin varnish is known, yet a primer or under coating is necessary for non-porous objects such as metal because the vinyl resin varnish will not adhere to metal and other non-porous objects. A surface coated with the improved primer and the vinyl resin will be resistant to practically every chemical, because I am aware of no chemical which will injure or destroy both this improved primer coating and the vinyl resin finish.

The improved primer is also very useful for the coating of both inner and outer surfaces of concrete sewer pipes, because it is inert to and unaffected by the oils, greases, alkalis, soaps and other chemicals which are commonly discharged into sewer pipes, and which attack and cause deterioration of the concrete of the pipes unless the surfaces of the pipes are protected. The improved primer is also useful on concrete, asphalt and tar surfaced highways as a primer or under coating to which is applied the marking paints which divide the highway surface into traffic lanes or which carry traffic warnings or traffic information. The ordinary marking paints that are now used on highways are short lived, because they are attacked and deteriorated by the action of the lime in the concrete or by the components of the tar or asphalt, whereas this improved primer is inert to all of those substances and is hard and flexible so as to be highly resistant to traffic wear. By first applying this improved primer and then applying the ordinary marking paints thereover, the life of the marking paints is very greatly extended, and when the marking paint becomes faint through wear of traffic, a new coating of the marking paint may be applied over the old primer coating. If sufficient pigment was incorporated in the improved primer so that the use of the marking paint as a second coating was unnecessary, the pigment in the primer coating would weaken the strength of the coating and decrease its life to some extent.

This improved primer is also useful for the lining of metal food containers and beer kegs or barrels, because it is resistant to alcohol and other ingredients of the contents of the barrels or kegs, and is flexible, yet extremely hard and durable. It will receive and hold a coating of brewer's pitch, which is formed of cotton seed pitch, gilsonite and wax, and other resinous and wax combinations. This brewer's pitch and other similar combinations are commonly used for the lining of steel beer barrels, but are unsatisfactory for that purpose alone, because they scratch easily and expose the steel of which the barrels are made. The improved primer is also useful as an under coating for receiving and holding a layer of textile flock which is forced or blown against a surface coated with this improved primer before the primer has hardened, and by the use of colored flock and stencils, the flock can have blown against the primer in a manner to produce a variety of designs in color. Wall board coated with this primer and textile flock is an excellent sound deadening or acoustic wall.

I claim:

1. The method of providing a metallic object with an adherent coating of a polymerized, thermoplastic vinyl resin comprising essentially the conjoint polymer of vinyl chloride and a vinyl ester of a lower fatty acid, which method comprises first coating said object with a liquid containing a phenol-aldehyde-alkali catalyst type condensation resin, redissolved in a phenol and blended with another resin having the property of adherence to metal, hardening said applied coating, and then applying to the hardened coating on said object, another coating of a liquid containing said vinyl resin in a ketonic solvent.

2. The method of providing a metallic object with an adherent coating of a polymerized, thermoplastic vinyl resin comprising essentially the conjoint polymer of vinyl chloride and a vinyl ester of a lower fatty acid, which method comprises first coating said object with a liquid containing a phenol-aldehyde-alkali catalyst type condensation resin, redissolved in a phenol and blended with another resin having the property of adherence to metal, heating said coated article to harden the resinous coating thereon, and advance it towards an approximately infusible and insoluble stage, and then applying over the hardened coating another coating containing said vinyl resin in solution.

3. The method of providing a metallic object with an adherent coating of a polymerized, thermoplastic vinyl resin comprising essentially the conjoint polymer of vinyl chloride and a vinyl ester of a lower fatty acid, which method comprises first coating said object with a liquid containing a phenol-aldehyde-alkali catalyst type condensation resin, redissolved in a phenol and blended with a resin formed of phthalic anhydride, glycerol, and a fatty acid, hardening said applied coating, and then applying to the hardened coating, another coating containing said vinyl resin in solution in a ketonic solvent.

4. The method of providing a metallic object with an adherent coating of a polymerized, thermoplastic, vinyl resin comprising essentially the conjoint polymer of vinyl chloride and a vinyl ester of a lower fatty acid, which method comprises first coating said object with a liquid containing a phenol-aldehyde-alkali catalyst type, condensation resin redissolved in a relatively high boiling solvent, and blended with another resin having the property of adherence to metal, hardening said applied coating, and then applying to the hardened coating another coating containing said vinyl resin in solution in a ketonic solvent.

5. The method of providing a metallic object with an adherent coating of a polymerized, thermoplastic vinyl resin comprising essentially the conjoint polymer of vinyl chloride and a vinyl ester of a lower fatty acid, which method comprises first coating said object with a liquid containing a phenol-aldehyde-alkali catalyst type condensation resin, redissolved in a phenol and blended with another resin having the property of adherence to metal, heating the coated article to harden the coating and advance it toward the infusible and insoluble stage, cooling said article, and then applying to said hardened coating another coating of a liquid containing said vinyl resin in a ketonic solvent.

6. A coated article comprising a metallic body having on the face thereof an adherent hardened primer coating containing a phenol-aldehyde-alkali catalyst condensation resin of the advancing type, blended with another resin which has the property of adherence to metal, and a superposed coating of a hardened vinyl resin consisting essentially of vinyl chloride conjointly polymerized with vinyl acetate.

7. A coated article comprising a metallic body having on the face thereof an adherent hardened primer coating containing a phenol-aldehyde-alkali catalyst condensation resin of the advancing type, blended with another resin which has the property of adherence to metal, said coating being advanced approximately to the infusible and insoluble stage, and a second coating superposed upon the primer coating and containing a resin obtained by the conjoint polymerization of vinyl acetate and vinyl chloride.

8. The method of providing a metallic object with an adherent hardened coating of a polymerized vinyl resin comprising essentially the conjoint polymer of vinyl chloride and a vinyl ester of a lower fatty acid which method comprises first coating said object with a liquid containing a phenol-aldehyde-alkali catalyst type condensation resin, redissolved in a phenol solvent and blended with a resin selected from the group consisting of the kauri natural resins, "Vinsol Resin No. 1" which is believed to consist chiefly of oxidized and highly polymerized abietic acids and terpenes, and which is the gasoline-insoluble portion of oxidized abietic acid produced by the steam distilled process of Naval Stores Manufacture, and a resin formed of phthalic anhydride, glycerol and a fatty acid, hardening the applied coating, and then applying to the hardened coating another coating of a liquid containing said vinyl resin in a ketonic solvent.

9. The method of providing a metallic object with an adherent coating of a vinyl resin comprising essentially the conjoint polymer of vinyl chloride and a vinyl ester of a lower fatty acid, which method comprises first coating said object with a liquid containing a phenol-aldehyde condensation resin in an advancing stage, redissolved in a high boiling solvent, and blended with another resin having the property of adherence to metal, hardening said applied coating, and then applying to the hardened coating another coating of a liquid containing said vinyl resin in a ketonic solvent and a small proportion of a phenol.

10. The method of providing a metallic object with an adherent coating of a polymerized vinyl resin comprising essentially the conjoint polymer of vinyl chloride and a vinyl ester of a lower fatty acid which method comprises first coating said object with a liquid containing a mixture of about 75 per cent of an alcohol solution of a phenol-aldehyde-condensation resin in an advancing stage, and about 25 per cent of a resin of the phthalic type in a xylol solution, to which mixture has been added a phenol solvent in an amount from 10 to 30 per cent of the solvent strength of the mixture, heating the coated article to eliminate the alcohol, xylol and phenolic solvents and to advance the blend of resins materially towards the insoluble and infusible stage and harden the same, and then applying to the hardened coating another coating of a liquid containing said vinyl resin in a ketonic solvent to which a small amount of a phenol has been added.

11. The method of providing a metallic object with an adherent hardened coating of a polymerized vinyl resin comprising essentially the conjoint polymer of vinyl chloride and a vinyl ester of a lower fatty acid which method comprises first coating said object with a liquid containing a phenol-aldehyde-alkali catalyst type condensation resin, redissolved in a solvent having a boiling point in excess of approximately 140° C. and blended with a resin having the property of adherence to metal, heating said object to a temperature of at least approximately 140° C. to drive off said solvent and harden said coating, and then applying to the hardened coating another coating of a liquid containing said vinyl resin in a ketonic solvent.

12. The method of providing a metallic object with an adherent coating of a vinyl resin comprising essentially the conjoint polymer of a vinyl chloride and a vinyl ester of a lower fatty acid, which method comprises first coating said object with a liquid containing a phenol-aldehyde condensation resin in an advancing stage, redissolved in a mixture of solvents, one of which has a low boiling point and another of which has a boiling point in excess of approximately 140° C., and blended with another resin having the property of adherence to metal, hardening said applied coating, and then applying to the hardened coating another coating of a liquid containing said vinyl resin in a ketonic solvent and a small proportion of a phenol.

JOHN FLETCHER.